US012046405B2

(12) United States Patent
Cho et al.

(10) Patent No.: US 12,046,405 B2
(45) Date of Patent: Jul. 23, 2024

(54) COIL COMPONENT

(71) Applicant: SAMSUNG ELECTRO-MECHANICS CO., LTD., Suwon-si (KR)

(72) Inventors: Min Ji Cho, Suwon-si (KR); Jae Hun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 693 days.

(21) Appl. No.: 17/159,762

(22) Filed: Jan. 27, 2021

(65) Prior Publication Data

US 2022/0165478 A1 May 26, 2022

(30) Foreign Application Priority Data

Nov. 20, 2020 (KR) ........................ 10-2020-0156835

(51) Int. Cl.
*H01F 27/29* (2006.01)
*H01F 27/24* (2006.01)
(Continued)

(52) U.S. Cl.
CPC ......... *H01F 27/2804* (2013.01); *H01F 27/24* (2013.01); *H01F 27/29* (2013.01); *H01F 27/323* (2013.01); *H01F 2027/2809* (2013.01)

(58) Field of Classification Search
CPC ...... H01F 27/2804; H01F 27/24; H01F 27/29; H01F 27/323; H01F 2027/2809;
(Continued)

(56) References Cited

U.S. PATENT DOCUMENTS

2014/0009254 A1* 1/2014 Ohkubo .............. H01F 17/0033 336/192
2015/0102891 A1* 4/2015 Yoon .................. H01F 27/2804 336/200

(Continued)

FOREIGN PATENT DOCUMENTS

KR 10-2015-0033343 A 4/2015
KR 10-1662209 B1 10/2016

(Continued)

OTHER PUBLICATIONS

Wurth, "WE-MAPI, 2510 Wire-wound SMD Inductor with a Composite Iron Powder Core, 4.7 uh +20% Moulded 940mA Idc," (https://sg.rs-online.com/web/p/wire-wound-surface-mount-inductors/7922720/).

*Primary Examiner* — Mang Tin Bik Lian
(74) *Attorney, Agent, or Firm* — Morgan, Lewis & Bockius LLP

(57) ABSTRACT

A coil component includes a body, a support substrate disposed in the body, a coil unit including a coil pattern disposed on the support substrate and perpendicular to a first surface of the body and first and second lead portions exposed to the first surface of the body and spaced apart from each other, and first and second external electrodes disposed on the first surface of the body, spaced apart from each other, and connected to the first and second lead portions, respectively, wherein each of the first and second lead portions and the coil pattern includes a first metal layer disposed on the support substrate and each of the first and second lead portions further includes a second metal layer disposed on the first metal layer.

18 Claims, 7 Drawing Sheets

(51) Int. Cl.
*H01F 27/28* (2006.01)
*H01F 27/32* (2006.01)

(58) Field of Classification Search
CPC ...... H01F 5/04; H01F 17/0006; H01F 27/292; H01F 17/04; H01F 2017/048; H01F 27/28; H01F 27/306; H01F 27/02; H01F 2017/002
See application file for complete search history.

(56) References Cited

U.S. PATENT DOCUMENTS

| | | | | |
|---|---|---|---|---|
| 2016/0343500 | A1* | 11/2016 | Jung | H01F 41/042 |
| 2017/0110236 | A1* | 4/2017 | Jang | H01F 41/10 |
| 2018/0286561 | A1* | 10/2018 | Shimoichi | H01F 41/10 |
| 2019/0115134 | A1* | 4/2019 | Park | H01F 27/292 |
| 2019/0189333 | A1* | 6/2019 | Kido | H01F 27/2804 |
| 2020/0194167 | A1 | 6/2020 | Lee et al. | |
| 2021/0027934 | A1* | 1/2021 | Mizukami | H01F 27/2804 |
| 2022/0102045 | A1* | 3/2022 | Okumura | H01F 27/29 |

FOREIGN PATENT DOCUMENTS

| | | | |
|---|---|---|---|
| KR | 10-2019-0062342 | A | 6/2019 |
| KR | 10-2020-0074479 | A | 6/2020 |

* cited by examiner

COIL COMPONENT

CROSS-REFERENCE TO RELATED APPLICATION(S)

This application claims the benefit of priority to Korean Patent Application No. 10-2020-0156835 filed on Nov. 20, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices along with a resistor and a capacitor.

As electronic devices increasingly been implemented with higher levels of performance and have become compact, a larger number of electronic components are used in electronic devices and electronic components and are reduced in size.

In the case of a thin film-type coil component, a body is formed by stacking and curing a magnetic composite sheet in which metal magnetic powder particle is dispersed in an insulating resin on a substrate on which a coil unit is formed by plating, and external electrodes are formed on a surface of the body.

SUMMARY

Example embodiments provide a coil component in which external electrodes are easily formed on a surface of a body such that bonding strength between the external electrodes and a coil unit can be improved.

According to one exemplary embodiment of the present disclosure, a coil component includes: a body; a support substrate disposed in the body; a coil unit including a coil pattern disposed on the support substrate and perpendicular to a first surface of the body and first and second lead portions exposed to the first surface of the body and spaced apart from each other; and first and second external electrodes disposed on the first surface of the body, spaced apart from each other, and connected to the first and second lead portions, respectively, wherein each of the first and second lead portions and the coil pattern includes a first metal layer disposed on the support substrate and each of the first and second lead portions further includes a second metal layer disposed on the first metal layer.

According to another exemplary embodiment of the present disclosure, a coil component includes: a body having a first surface, a first side surface and a second side surface, the first and second side surfaces each being connected to the first surface and facing each other in a first direction; a support substrate disposed in the body; a coil unit including a coil pattern disposed on at least one surface of the support substrate and perpendicular to the first surface of the body, and first and second lead portions exposed to the first surface of the body and spaced apart from each other; and first and second external electrodes disposed on the first surface of the body, spaced apart from each other, and connected to the first and second lead portions, respectively, wherein a length, from one surface of the support substrate along the first direction, of the first lead portion exposed to the first surface of the body is greater than a length, from the one surface of the support substrate along the first direction, of the coil pattern.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
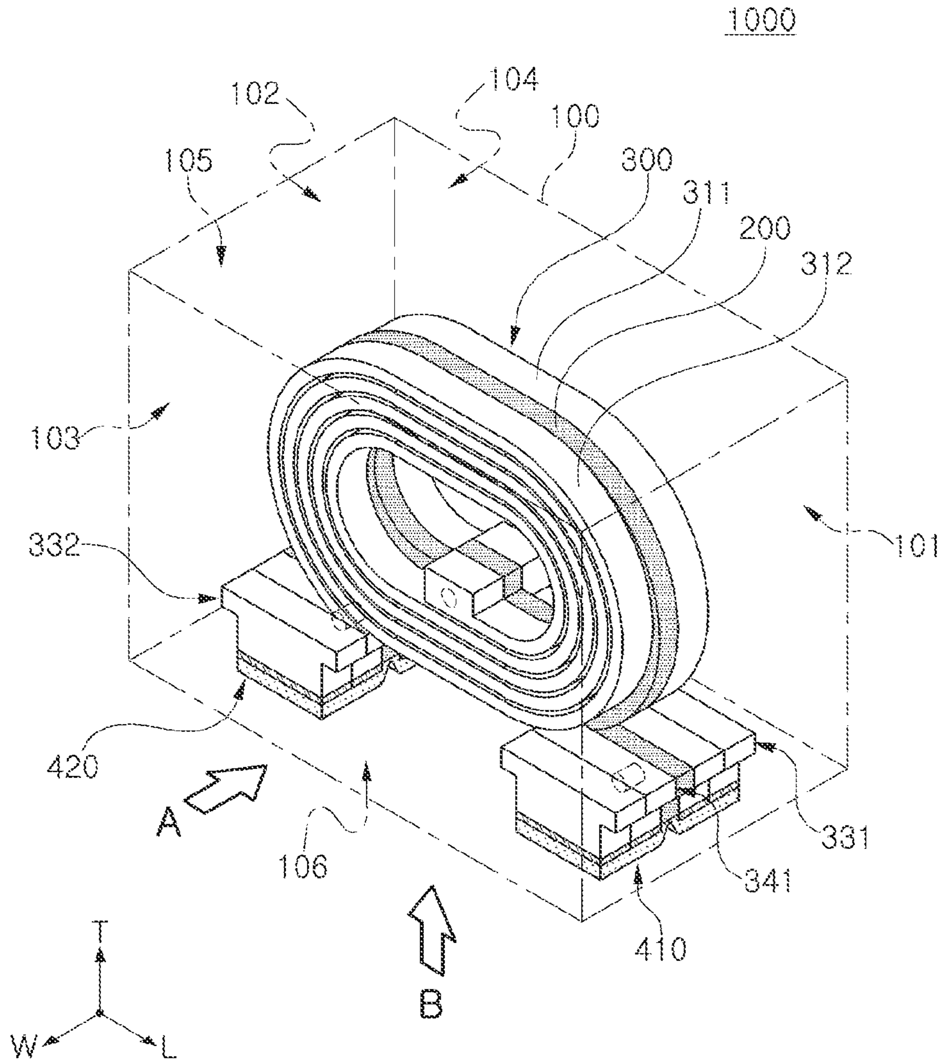
FIG. 1 is a view schematically illustrating a coil component according to an example embodiment of the present disclosure.

In the drawings, an L direction may be defined as a first direction or a length direction, a W direction may be defined as a second direction or a width direction, and a T direction may be defined as a third direction or a thickness direction.

Hereinafter, a coil component according to an example embodiment of the present disclosure will be described in detail with reference to the accompanying drawings, and in the description with reference to the accompanying drawings, the same or corresponding components are denoted by the same reference numerals and duplicate descriptions thereof will be omitted.

Various types of electronic components are used in electronic devices, and various types of coil components may be appropriately used between these electronic components to remove noise.

That is, in an electronic device, a coil component may be used as a power inductor, a high frequency (HF) inductor, a general bead, a high frequency bead (GHz bead), a common mode filter, and the like.

Figure 2:
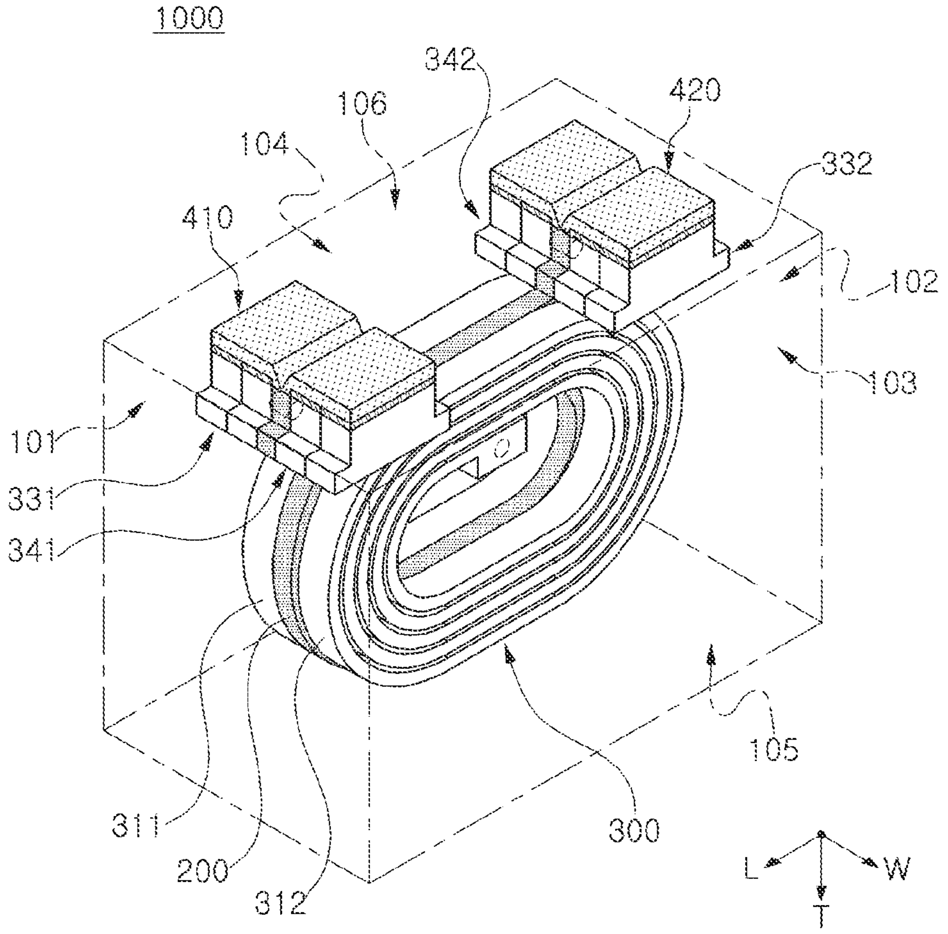
FIG. 2 is a bottom perspective view of a coil component according to an example embodiment of the present disclosure.
Figure 3:
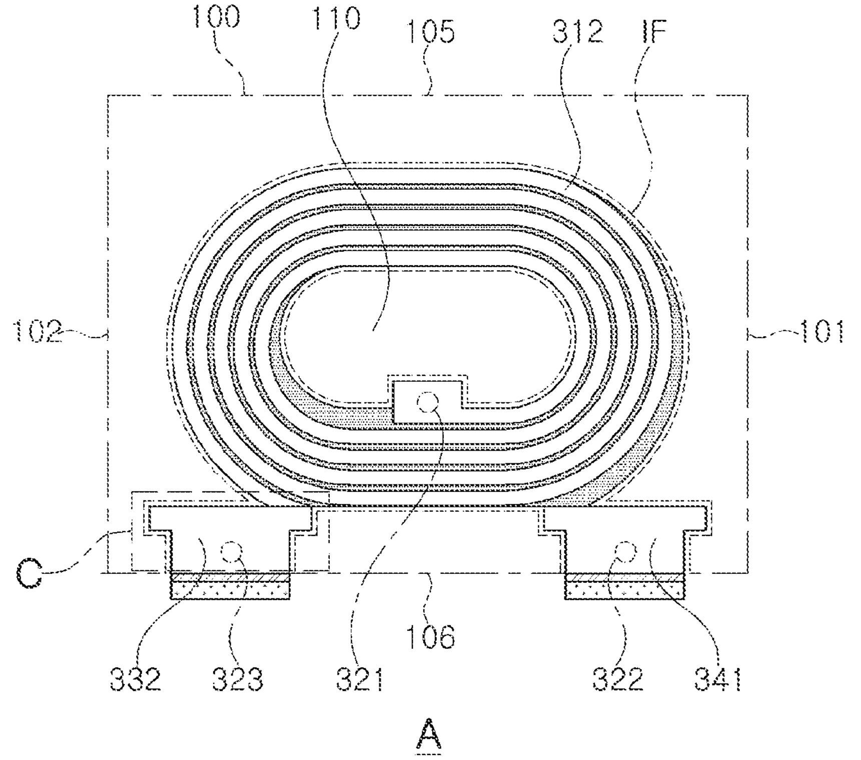
FIG. 3 is a view schematically illustrating the coil component of FIG. 1 viewed in a direction A.
Figure 4:
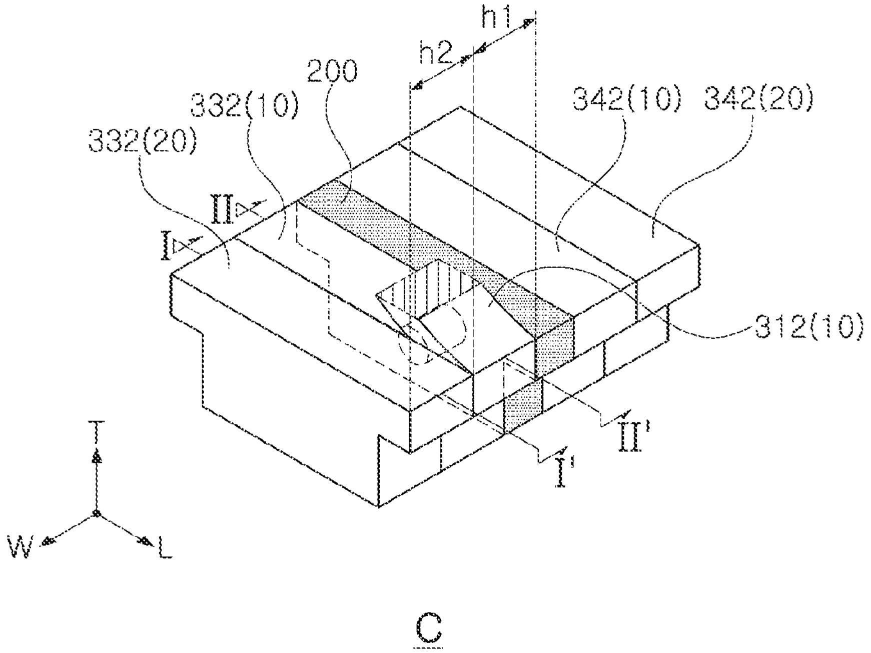
FIG. 4 is an enlarged view of C in FIG. 3.
Figure 5:
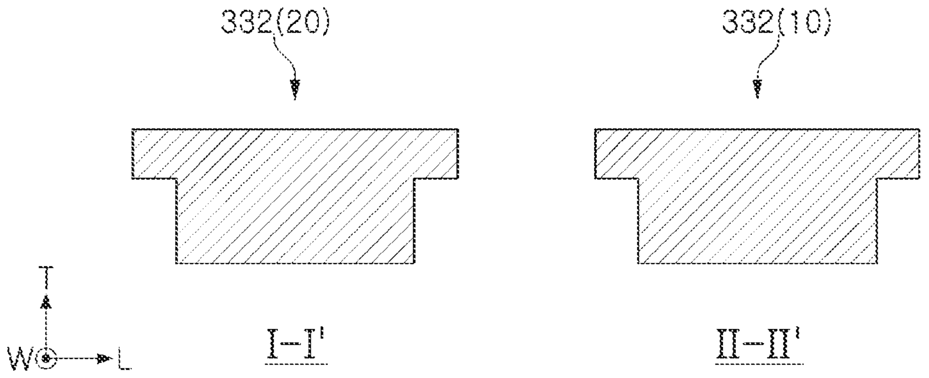
FIG. 5 is a cross-sectional view taken along lines I-I' and II-II' of FIG. 4.

FIG. 1 is a view schematically illustrating a coil component according to an example embodiment of the present disclosure. FIG. 2 is a bottom perspective view of a coil component according to an example embodiment of the present disclosure. FIG. 3 is a view schematically illustrating the coil component of FIG. 1 viewed in a direction A. FIG. 4 is an enlarged view of C in FIG. 3. FIG. 5 is a cross-sectional view taken along lines I-I' and II-II' of FIG.

Figure 6:
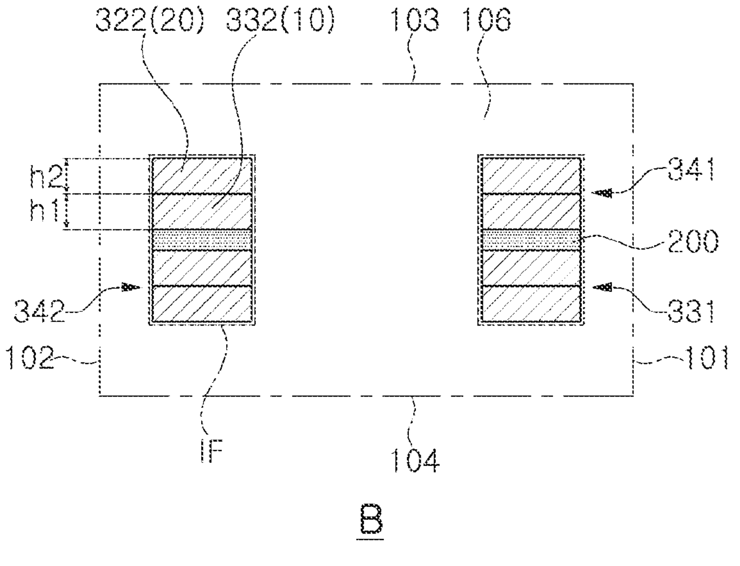
FIG. 6 is a view schematically illustrating the coil component of FIG. 1 viewed in a direction B.
Figure 7:
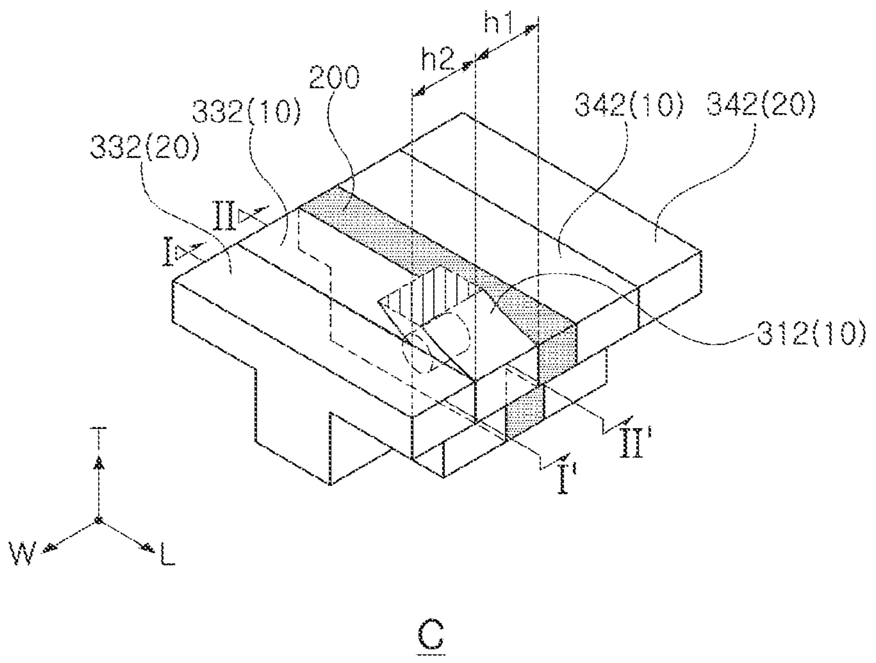
FIG. 7 is a view schematically illustrating a modification of an example embodiment of the present disclosure, which corresponds to FIG. 4.
Figure 8:
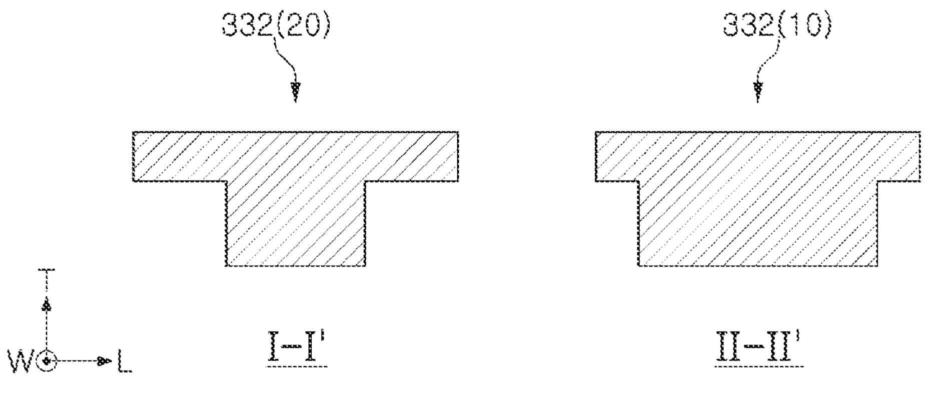
FIG. 8 is a cross-sectional view taken along lines I-I' and II-II' of FIG. 7.
Figure 9:
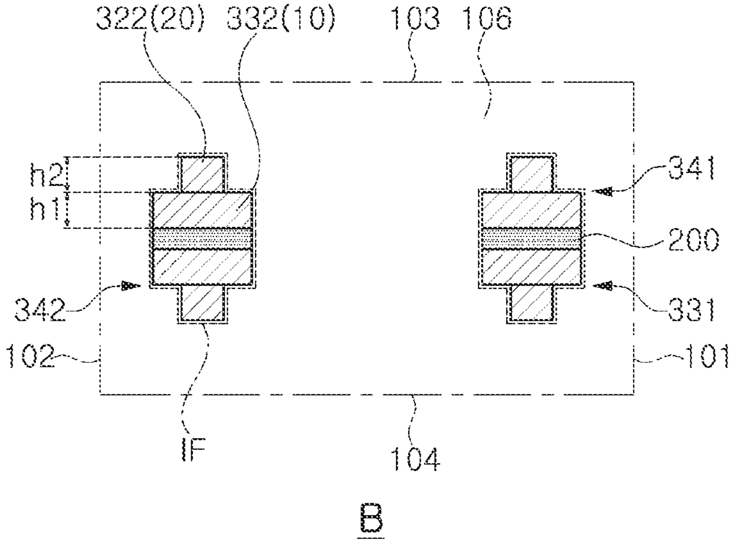
FIG. 9 is a view schematically illustrating one modification of FIG. 7 viewed in the direction B of FIG. 1.
Figure 10:
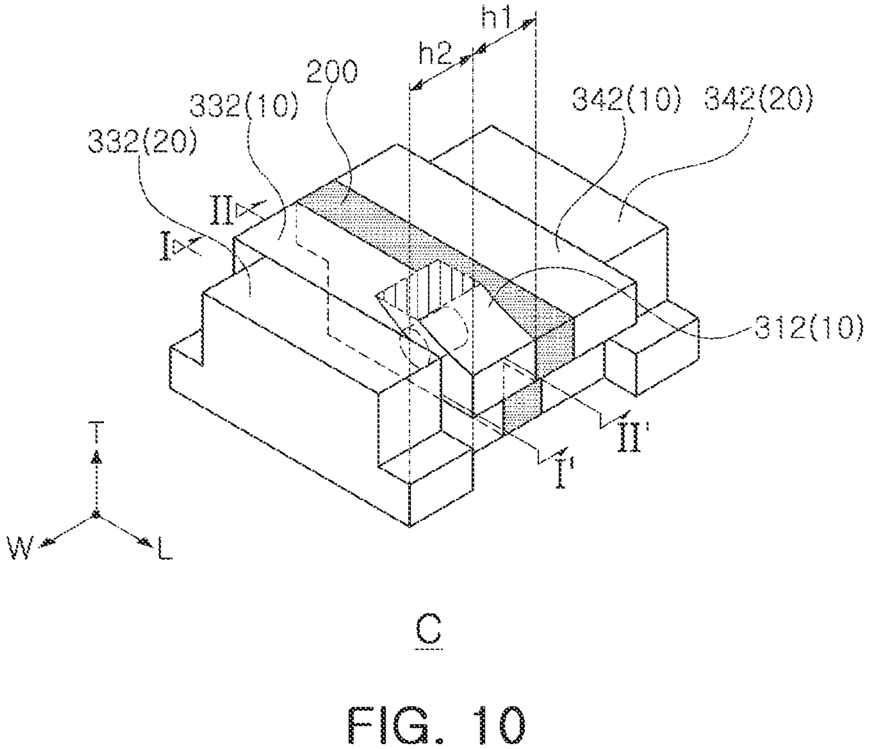
FIG. 10 is a view schematically illustrating another modification of the present disclosure, which corresponds to FIG. 4.
Figure 11:
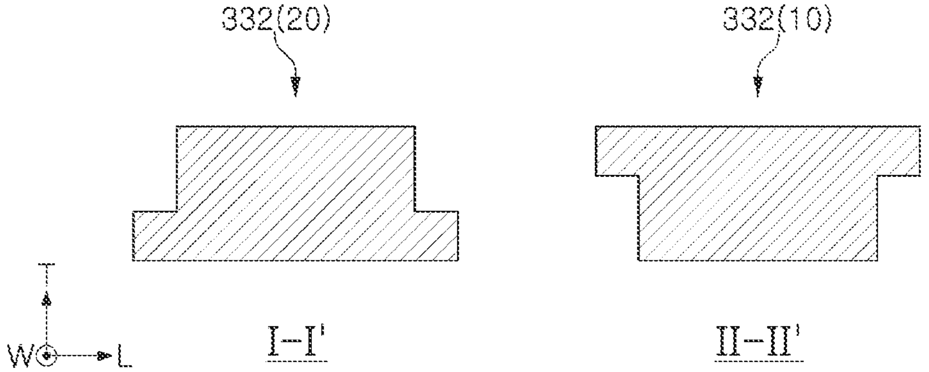
FIG. 11 is a cross-sectional view taken along lines I-I' and II-II' of FIG. 10.
Figure 12:
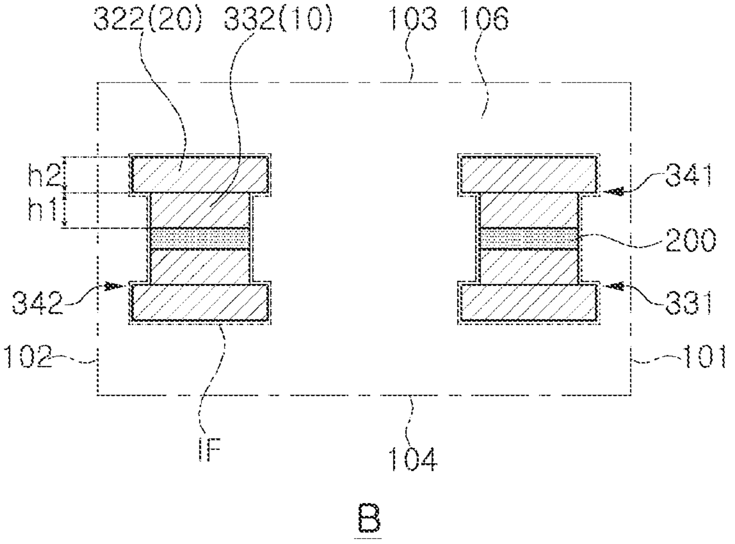
FIG. 12 is a view schematically illustrating another modification of FIG. 10, viewed in the direction B of FIG. 1.

4. FIG. 6 is a view schematically illustrating the coil component of FIG. 1 viewed in a direction B. FIG. 7 is a view schematically illustrating a modification of an example embodiment of the present disclosure, which corresponds to FIG. 4. FIG. 8 is a cross-sectional view taken along lines I-I' and II-II' of FIG. 7. FIG. 9 is a view schematically illustrating one modification of FIG. 7 viewed in the direction B of FIG. 1. FIG. 10 is a view schematically illustrating another modification of the present disclosure, which corresponds to FIG. 4. FIG. 11 is a cross-sectional view taken along lines I-I' and II-II' of FIG. 10. FIG. 12 is a view schematically illustrating another modification of FIG. 10, viewed in the direction B of FIG. 1. Meanwhile, FIGS. 6, 9, and 12 show the coil component viewed in the direction B of FIG. 1 in which external electrodes are omitted.

Referring to FIGS. 1 to 12, a coil component 1000 according to an example embodiment of the present disclosure may include a body 100, a support substrate 200, a coil unit 300, external electrodes 410 and 420.

The body 100 forms an exterior of the coil component 1000 according to the present example embodiment and includes the coil unit 300 embedded therein.

The body 100 may have a hexahedral shape as a whole.

In FIGS. 1 to 3, the body 100 includes a first surface 101 and a second surface 102 facing each other in a length direction L, a third surface 103 and a fourth surface 104 facing each other in a width direction W, and a fifth surface 105 and a sixth surface 106 facing each other in a thickness direction T. Each of the first to fourth surfaces 101, 102, 103, and 104 of the body 100 corresponds to a wall surface of the body 100 that connects the fifth surface 105 and the sixth surface 106 of the body 100. Hereinafter, both end surfaces (one end surface and the other end surface) of the body 100 may refer to the first surface 101 and the second surface 102 of the body 100, and both side surfaces (one side surface and the other side surface) of the body 100 may refer to the third surface 103 and the fourth surface 104 of the body 100. Also, one surface and the other surface of the body 100 may refer to the sixth surface 106 and the fifth surface 105 of the body 100, respectively.

By way of example, the body 100 may be formed such that the coil component 1000 according to the present example embodiment including external electrodes 410 and 420 and a surface insulating layer 600 to be described later has a length of 1.0 mm, a width of 0.5 mm, and a thickness of 0.8 mm but is not limited thereto. Meanwhile, the aforementioned dimensions are merely design values that do not reflect process errors, etc., and thus, it should be appreciated that dimensions within a range admitted as a process error fall within the scope of the present disclosure.

Based on an optical microscope or a scanning electron microscope (SEM) image for a length directional (L)-thickness directional (T) cross-section at a width-directional (W) central portion of the coil component 1000, the length of the coil component 1000 may refer to a maximum value among lengths of a plurality of segments parallel to the length direction L when two outermost boundary lines of the coil component 1000 illustrated in the image of the cross-section facing each other in the length direction L are connected. Alternatively, the length of the coil component 1000 described above may refer to a minimum value among the lengths of the plurality of segments parallel to the length direction L when two outermost boundary lines of the coil component 1000 illustrated in the image of the cross-section facing each other in the length direction L are connected. Alternatively, the length of the coil component 1000 described above may refer to an arithmetic mean value of at least two of the plurality of segments parallel to the length direction L when two outermost boundary lines of the coil component 1000 illustrated in the cross-sectional image facing each other in the length direction L are connected.

Based on an optical microscope or a scanning electron microscope (SEM) image for a length directional (L)-thickness directional (T) cross-section in a width-directional (W) central portion of the coil component 1000, the thickness of the coil component 1000 may refer to a maximum value among lengths of a plurality of segments parallel to the thickness direction T when two outermost boundary lines of the coil component 1000 illustrated in the image of the cross-section facing each other in the thickness direction T are connected. Alternatively, the thickness of the coil component 1000 described above may refer to a minimum value among the lengths of the plurality of segments parallel to the thickness direction T when two outermost boundary lines of the coil component 1000 illustrated in the image of the cross-section facing each other in the thickness direction T are connected. Alternatively, the thickness of the coil component 1000 described above may refer to an arithmetic mean value of at least two of the plurality of segments parallel to the thickness direction T when two outermost boundary lines of the coil component 1000 illustrated in the cross-sectional image facing each other in the thickness direction T are connected.

Based on an optical microscope or a scanning electron microscope (SEM) image for a length directional (L)-width directional (W) cross-section at a thickness-directional (T) central portion of the coil component 1000, the width of the coil component 1000 may refer to a maximum value among lengths of a plurality of segments parallel to the width direction W when two outermost boundary lines of the coil component 1000 illustrated in the image of the cross-section facing each other in the width direction W are connected. Alternatively, the width of the coil component 1000 described above may refer to a minimum value among the lengths of the plurality of segments parallel to the width direction W when two outermost boundary lines of the coil component 1000 illustrated in the image of the cross-section facing each other in the width direction W are connected. Alternatively, the width of the coil component 1000 described above may refer to an arithmetic mean value of at least two of the plurality of segments parallel to the width direction W when two outermost boundary lines of the coil component 1000 illustrated in the cross-sectional image facing each other in the width direction W are connected.

Alternatively, each of the length, width, and thickness of the coil component 1000 may be measured by a micrometer measurement method. With the micrometer measurement method, ach of the length, width, and thickness of the coil component 1000 may be measured by setting a zero point with a gage repeatability and reproducibility (R&R) micrometer, inserting the coil component 1000 according to the present example embodiment into a tip of the micrometer, and turning a measurement lever of the micrometer. In measuring the length of the coil component 1000 by the micrometer measurement method, the length of the coil component 1000 may refer to a value measured once or an arithmetic mean of values measured multiple times. This may equally be applied to the width and thickness of the coil component 1000.

The body 100 includes metal magnetic powder particle and an insulating resin. Specifically, the body 100 may be formed by stacking at least one magnetic composite sheet including an insulating resin and metal magnetic powder particle dispersed in the insulating resin.

Magnetic metal powder particle may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder particles 20 and 30 may be at least one of pure iron powder particle, Fe—Si-based alloy powder particle, Fe—Si—Al-based alloy powder particle, Fe—Ni-based alloy powder particle, Fe—Ni—Mo-based alloy powder particle, Fe—Ni—Mo—Cu-based alloy powder particle, Fe—Co-based alloy powder particle, Fe—Ni—Co-based alloy powder particle, Fe—Cr-based alloy powder particle, Fe—Cr—Si alloy powder particle, Fe—Si—Cu—Nb-based alloy powder particle, Fe—Ni—Cr-based alloy powder particle, and Fe—Cr—Al-based alloy powder particle.

The metal magnetic powder particle may be amorphous or crystalline. For example, the metal magnetic powder particle may be a Fe—Si—B—Cr-based amorphous alloy powder particle, but is not limited thereto. The metal magnetic powder particle may have an average diameter of about 0.1 μm to 30 μm, but is not limited thereto.

The metal magnetic powder particle may include a first powder particle and a second powder particle having a particle diameter smaller than that of the first powder particle. In the present disclosure, a particle diameter or an average diameter may refer to a particle size distribution expressed by $D_{90}$ or $D_{50}$. In the case of the present disclosure, since the metal magnetic powder particle includes the first powder particle and the second powder particle having a particle diameter smaller than that of the first powder particle, the second powder particle may be disposed in a space between the first powder particles, and as a result, a rate of filling a magnetic material in the body 100 may be improved. Meanwhile, as another example of the present disclosure, the metal magnetic powder particle may include three types of powder particles having different particle sizes. An insulating coating layer may be formed on a surface of the metal magnetic powder particle, but is not limited thereto.

The insulating resin may include, but is not limited to, epoxy, polyimide, liquid crystal polymer, or the like alone or in combination.

The body 100 has a core 110 penetrating the support substrate 200 and the coil unit 300 to be described later. The core 110 may be formed as the magnetic composite sheet fills a through hole of the coil unit 300, but is not limited thereto.

The support substrate 200 is disposed in the body 100. The support substrate 200 is configured to support the coil unit 300 to be described later.

The support substrate 200 may be formed of an insulating material including a thermosetting insulating resin such as an epoxy resin, a thermoplastic insulating resin such as polyimide, or a photosensitive insulating resin or may be formed of an insulating material prepared by impregnating a reinforcing material such as glass fiber or inorganic filler in this insulating resin. As an example, the support substrate 200 may be formed of insulating materials such as prepreg, Ajinomoto build-up film (ABF), FR-4, a bismaleimide triazine (BT) resin, a photo imageable dielectric (PID), a copper clad laminate (CCL), etc., but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder particle, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of an insulating material including a reinforcing material, the support substrate 200 may provide more excellent rigidity. When the support substrate 200 is formed of an insulating material not containing glass fiber, the support substrate 100 may reduce an overall thickness of the coil unit 300 (which refers to the sum of dimensions of the coil unit and the support substrate 200 along the width direction W of FIG. 1) to advantageously reduce a width of a component. When the support substrate 200 is formed of an insulating material including a photosensitive insulating resin, the number of processes for forming the coil unit 300 may be reduced, which is advantageous in reducing production cost and forming fine vias.

The coil unit 300 is disposed on the support substrate 200. The coil unit 300 is embedded in the body 100 to manifest the characteristics of the coil component. For example, when the coil component 1000 of the present example embodiment is used as a power inductor, the coil unit 300 may serve to stabilize power of an electronic device by storing an electric field as a magnetic field and maintaining an output voltage.

Meanwhile, in the case of the present example embodiment, since the coil unit 300 is disposed perpendicular to the sixth surface 106 of the body 100, which is a mounting surface, a mounting area may be reduced, while a volume of the body 100 and the coil unit 300 is maintained. Therefore, a larger number of electronic components may be mounted on a mounting board having the same area. In addition, in the case of the present example embodiment, since the coil unit 300 is disposed perpendicular to the sixth surface 106 of the body 100 which is the mounting surface, a direction of a magnetic flux induced to the core 110 by the coil unit 300 is parallel to the sixth surface 106 of the body 100. As a result, noise induced to the mounting surface of the mounting board may be relatively reduced.

The coil unit 300 is formed on at least one of both surfaces of the support substrate 200 facing each other and forms at least one turn. The coil unit 300 is disposed on one surface and the other surface of the support substrate 200 facing each other in the width direction W of the body 100 and is disposed perpendicular to the sixth surface 106 of the body 100. In the present example embodiment, the coil unit 300 includes coil patterns 311 and 312, vias 321, 322 and 323, and lead portions 331, 341; 332, and 342.

The first coil pattern 311 and the second coil pattern 312 are disposed on both surfaces of the support substrate 200 facing each other and have a planar spiral shape forming at least one turn around the core 110. As an example, based on the directions of FIG. 1, the first coil pattern 311 is disposed on the rear surface of the support substrate 200 to form at least one turn around the core 110. The second coil pattern 312 is disposed on the front surface of the support substrate 200 to form at least one turn around the core 110. In each of the first and second coil patterns 311 and 312, ends of the outermost turns connected to the lead patterns 331 and 332 extend toward the sixth surfaces 106 of the body 100 from a central portion of the body 100 in the thickness direction T. As a result, the first and second coil patterns 311 and 322 may increase the number of turns of the entirety of the coil unit 300 as compared to a case in which the ends of the outermost turns of the coil are formed only up to the central portion of the body 100 in the thickness direction T.

The lead portions 331, 341; 332, and 342 are exposed to the sixth surface 106 of the body 100 and spaced apart from each other. In the present example embodiment, the lead portions 331 and 341; 332 and 342 include lead patterns 331 and 332 and sub-lead patterns 341 and 342. Specifically, based on the directions of FIG. 1, the first lead portions 331 and 341 include a first lead pattern 331 extending from the first coil pattern 311 on the rear surface of the support substrate 200 and exposed to the sixth surface 106 of the body 100 and a first sub-lead pattern 341 disposed at a position corresponding to the first lead pattern 331 on the front surface of the support substrate 200, having a shape corresponding to the first lead pattern 331, and spaced apart from the second coil pattern 312. The second lead portions 332 and 342 include a second lead pattern 332 extending from the second coil pattern 311 on the front surface of the support substrate 200 and exposed to the sixth surface 106 of the body 100 and a second sub-lead pattern 342 (See FIG. 2) disposed at a position corresponding to the second lead pattern 332 on the rear surface of the support substrate 200, having a shape corresponding to the second lead pattern 332, and spaced apart from the first coil pattern 311. The first lead portions 331 and 341 and the second lead portions 332 and 342 are exposed to be spaced apart from each other on the sixth surface of the body 100 and are in contact with and connected to first and second external electrodes 410 and 420 to be described later, respectively. Meanwhile, although not shown, the lead patterns 331 and 332 and the sub-lead patterns 341 and 342 may have through portions penetrating the lead patterns 331 and 332 and the sub-lead patterns 341 and 342, respectively. In this case, since at least a part of the body 100 is disposed in the through portions, a coupling force between the body 100 and the coil unit 300 may be improved (anchoring effect). Further, the through portions may penetrate the support substrate 200 disposed between lead patterns 331 and 332 and the sub-lead patterns 341 and 342, but the scope of the present disclosure is not limited thereto.

Meanwhile, the aforementioned sub-lead patterns 341 and 342 may be omitted in the present example embodiment when an electrical connection relationship between the coil unit 300 and the external electrodes 410 and 420 is considered, and thus, a case in which the sub-lead patterns 341 and 342 are omitted may be within the scope of the present disclosure. However, when the lead portions 331, 341; 332, and 342 include the lead patterns 331 and 332 and the sub-lead patterns 341 and 342 as in the present example embodiment, the external electrodes 410 and 420 formed on the sixth surface 106 of the body 100 may be formed to be symmetrical to each other, thereby reducing an appearance defect.

The first via 321 connects inner ends of the innermost turns of the first and second coil patterns to each other through the support substrate 200. The second via 322 connects the first lead pattern 331 and the first sub-lead pattern 341 to each other through the support substrate 200. The third via 323 connects the second lead pattern 332 and the second sub-lead pattern 342 to each other through the support substrate 200. Accordingly, the coil unit 300 functions as a single coil connected as a whole.

Meanwhile, as described above, since the sub-leading patterns 341 and 342 are components independent of an electrical connection relationship between the coil unit 300 and the external electrodes 410 and 420 to be described later, a case in which the second and third vias 322 and 323 are omitted may also be within the scope of the present disclosure. However, when the lead patterns 341 and 342 and the sub-lead patterns 341 and 342 are connected by the second and third vias 322 and 323 as in the present example embodiment, connection reliability of the coil unit 300 and the external electrodes 410 and 420 may be improved.

At least one of the coil patterns 311 and 312, the vias 321, 322, and 323, the lead patterns 331 and 332, and the sub-lead patterns 341 and 342 may include at least one conductive layer.

As an example, when the second coil pattern 312, the vias 321, 322, and 323, the second lead pattern 332, and the first sub-lead pattern 341 are formed by plating on the front surface (based on the directions of FIG. 1) of the support substrate 200, each of the second coil pattern 312, vias 321, 322, and 323, the second lead pattern 332, and the first sub-lead pattern 341 may include a seed layer and an electroplating layer. The seed layer may be formed by an electroless plating method or a vapor deposition method such as sputtering. Each of the seed layer and the electroplating layer may have a single-layer structure or a multilayer structure. The electroplating layer of a multilayer structure may be formed in a conformal film structure in which one electroplating layer is covered by another electroplating layer or in a shape in which another electroplating layer is stacked on only one surface of one electroplating layer. The seed layer of the second coil pattern 312, the seed layer of the vias 321, 322, and 323, and the seed layer of the second lead pattern 332 may be integrally formed so that a boundary may not be formed therebetween, but is not limited thereto. The electroplating layer of the second coil pattern 312, the electroplating layer of the vias 321, 322, and 323, and the electroplating layer of the second lead pattern 332 may be integrally formed so that a boundary may not be formed therebetween, but is not limited thereto.

The coil patterns 311 and 312, the vias 321, 322, and 323, the lead patterns 331 and 332, and the sub-lead patterns 341 and 342 may each include a conductive material such as copper (Cu), aluminum (Al), silver (Ag), tin (Sn), gold (Au), nickel (Ni), lead (Pb), titanium (Ti), chromium (Cr), molybdenum (Mo), or alloys thereof, but are not limited thereto.

Each of the first and second lead portions 331, 341, 332, and 342 and the coil patterns 311 and 312 may include a first metal layer 10 disposed on the support substrate 200, and the first and second lead portions 331, 341, 332, and 342 may each further include a second metal layer 20 disposed on the first metal layer 10. Since the lead portions 331, 341, 332, and 342 further include the second metal layer 20, compared with the coil patterns 311 and 312, a height (h1+h2) of each of the lead portions 331, 341, 332, and 342 may be higher than a height h1 of the coil patterns 311 and 312. As an example, referring to FIGS. 3 to 5, the second coil pattern 312 includes the first metal layer 10, and the second lead pattern 332 includes the first metal layer 10 and the second metal layer 20 disposed on the first metal layer 10. The first metal layer 10 of the second coil pattern 312 and the first metal layer 10 of the second lead pattern 332 may be electroplating layers formed together in the electroplating process of the coil patterns 311 and 312 described above. That is, the first metal layer 10 of the second coil pattern 312 and the first metal layer 10 of the second lead pattern 332 may be integrally formed with each other. In addition, the number of plating layers included in each of the first metal layer 10 of the second coil pattern 312 and the first metal layer 10 of the second lead pattern 332 may be equal to each other. As a result, the first metal layer 10 of the second coil pattern 312 and the first metal layer 10 of the second lead pattern 332 may have the substantially same height h1. The second metal layer 20 of the second lead pattern 332 may be an electroplating layer separately formed in a plating process different from the first metal layer 10 of the second lead pattern 332. The height h2 of the second metal layer 20 of the second lead pattern 332 may be substantially equal to the height h1 of the first metal layer 10 of the second lead pattern 332 (e.g., the heights of the first and second metal layers are substantially constant), but the scope of the present disclosure is not limited thereto. In the second lead pattern 332, the first metal layer 10 and the second metal layer 20 are formed in different electroplating processes, so that the first metal layer 10 and the second metal layer 20 may have a boundary therebetween. In this case, referring to FIG. 6, the boundary between the first metal layer 10 of the second lead pattern 332 and the second metal layer 20 of the second lead pattern 332 may be exposed to the sixth surface 106 of the body 100. In this example embodiment, since the height (h1+h2) of the second lead pattern 332 is higher than the height h1 of the second coil pattern 312, an exposed area of the second lead pattern 332 exposed to the sixth surface 106 of the body 100 may increase to facilitate formation of the second external electrode 420 on the sixth surface 106 of the body 100. For example, when the second external electrode 420 is formed by electroplating, since the exposed area of the second lead pattern 332 is relatively large, the second external electrode 420 having a larger area compared with the same plating time may be formed by plating.

In each of the first and second lead portions 331, 341, 332, and 342, a cross-section of the first metal layer 10 at the center thereof in the height direction (width direction W of FIG. 4) and a cross-section of the second metal layer 20 at the center thereof in the height direction (width direction W of FIG. 4) may have the substantially same shape. For example, referring to FIGS. 4 and 5, in the second lead pattern 332, a cross-section of the second metal layer 20 taken along line I-I' of FIG. 4 and a cross-section of the first metal layer 10 taken along line II-II' of FIG. 4 may have the substantially same shape. Accordingly, in the second lead pattern 332, a sectional area of the second metal layer 20 and a sectional area of the first metal layer 10 may be substantially equal to each other. Also, referring to FIG. 6, when the height h2 of the second metal layer 20 and the height h1 of the first metal layer 10 are substantially equal to each other, the exposed area of the first metal layer 10 and the exposed area of the second metal layer 20 of the second lead pattern 332 exposed to the sixth surface 106 of the body 100 may be substantially equal.

In each of the first and second lead portions 331, 341, 332, and 342, a cross-section of the first metal layer 10 at the center thereof in the height direction (width direction W of FIG. 7) and a cross-section of the second metal layer 20 at the center thereof in the height direction (width direction W of FIG. 7) may be different from each other. As an example, referring to FIGS. 7 to 9, in the second lead pattern 332, the cross-section of the second metal layer 20 taken along line I-I' of FIG. 7 and the cross-section of the first metal layer 10 taken along line II-II' of FIG. 7 may have a T shape as a whole, and a lower side line width (dimension in the length direction L of FIG. 8) of the second metal layer 20 may be smaller than a lower side line width (dimension in the length direction L of FIG. 8) of the first metal layer 10. Therefore, a sectional area of the second metal layer 20 and a sectional area of the first metal layer 10 of the second lead pattern 332 may be different from each other. Also, referring to FIG. 9, when the height h2 of the second metal layer 20 and the height h1 of the first metal layer 10 are substantially equal to each other, an exposed area of the first metal layer 10 may be larger than an exposed area of the second metal layer 20 of the second lead pattern 332 exposed to the sixth surface 106 of the body 100.

In each of the first and second lead portions 331, 341, 332, and 342, a cross-section of the first metal layer 10 at the center thereof in the height direction (width direction W of FIG. 10) and a cross-section of the second metal layer 20 at the center thereof in the height direction (width direction W of FIG. 10) may be symmetrical to each other. As an example, referring to FIGS. 10 to 12, in the second lead pattern 332, a cross-section of the second metal layer 20 taken along line I-I' of FIG. 10 may have a reverse T shape, and a cross-section of the first metal layer 10 taken along line II-II' of FIG. 10 may have a T shape. That is, in the second lead pattern 332, the second metal layer 20 may have a shape in which the first metal layer 10 is rotated by 180° with respect to the height direction. In this case, for the aforementioned reasons, the lower side line width (dimension in the length direction L of FIG. 11) of the second metal layer 20 may be larger than the lower side line width (dimension in the length direction L of FIG. 11) of the first metal layer 10. Therefore, referring to FIG. 12, when the height h2 of the second metal layer 20 and the height h1 of the first metal layer 10 are substantially equal to each other, the exposed area of the first metal layer 10 may be smaller than the exposed area of the second metal layer 20 in the second lead pattern 332 exposed to the sixth surface 106 of the body 100.

Meanwhile, in the above, the second coil pattern 312 and the second lead pattern 332 have been mainly described with reference to FIGS. 4 to 12, and the contents of the second coil pattern 312 described above may also be equally applied to the first coil pattern, and the contents of the second lead pattern 332 described above may also be equally applied to the first lead pattern 331 and the sub-lead patterns 341 and 342.

The external electrodes 410 and 420 are disposed spaced apart from each other on the sixth surface 106 of the body 100 and are connected to the lead portions 331, 332, 341, and 342, respectively. Specifically, the first external electrode 410 is disposed on the sixth surface 106 of the body 100 and is in contact with the first lead portions 331 and 341. The second external electrode 420 is spaced apart from the first external electrode 410 on the sixth surface 106 of the body 100 and is in contact with the second lead portions 332 and 342. Meanwhile, the support substrate 200 may be disposed between the first lead pattern 331 and the first sub-lead pattern 341 and exposed to the sixth surface 106 of the body 100, and in this case, a recess may be formed in a region of the first external electrode 410 corresponding to the support substrate 200 exposed to the sixth surface 106 of the body 100 due to plating variations, but is limited thereto.

When the coil component 1000 according to the present example embodiment is mounted on a printed circuit board (PCB) or the like, the external electrodes 410 and 420 electrically connect the coil component 1000 to the PCB or the like. As an example, the coil component 1000 according to the present example embodiment may be mounted so that the sixth surface 106 of the body 100 faces an upper surface of the PCB, and the external electrodes 410 and 420 disposed to be spaced apart from each other on the sixth surface of the body 100 and a connection portion of the PCB may be electrically connected.

The external electrodes 410 and 420 may be formed of copper (Cu), aluminum (Al), silver (Ag), tin (Sn), gold (Au), nickel (Ni), lead (Pb), chromium (Cr), titanium (Ti), or an alloy thereof, but is not limited thereto.

Each of the external electrodes 410 and 420 may be formed of a plurality of layers. As an example, the first external electrode 410 may include a first layer in contact with the first lead portions 331 and 341 and a second layer disposed on the first layer. Here, the first layer may be a conductive resin layer including conductive powder particle including at least one of copper (Cu) and silver (Ag) and an insulating resin, or a copper (Cu) plating layer. The second layer may have a dual-layer structure of a nickel (Ni) plating layer/tin (Sn) plating layer.

The coil component 1000 according to the present exemplary example embodiment may further include an insulating film IF formed on surfaces of the support substrate 200 and the coil unit 300. The insulating film IF serves to insulate the coil unit 300 from the body 100 and may include a known insulating material such as parylene, but is not limited thereto. The insulating film IF may be formed by a method such as vapor deposition, but is not limited thereto, and may be formed by stacking insulating films on both sides of the support substrate 200.

Meanwhile, although not shown, surface insulating layers covering the first to sixth surfaces 101, 102, 103, 104, 105, and 106 of the body 100 and exposing the external electrodes 410 and 420, respectively, may be further provided. The surface insulating layers may be formed by applying an insulating material including an insulating resin to the surface of the body 100 and curing the insulating material, for example. In this case, the surface insulating layers may include at least one of a thermoplastic resin such as polystyrene, vinyl acetate, polyester, polyethylene, polypropylene, polyamide, rubber, acrylic, or the like, a thermosetting resin such as phenol, epoxy, urethane, melamine, alkyd, or the like, and a photosensitive insulating resin.

According to example embodiments, the external electrodes may be easily formed on the surface of the body such that bonding strength between the external electrodes and the coil unit can be improved.

While example embodiments have been illustrated and described above, it will be apparent to those skilled in the art that modifications and variations could be made without departing from the scope of the present disclosure as defined by the appended claims.

What is claimed is:

1. A coil component comprising:

a body;

a support substrate disposed in the body;

a coil unit including:

a coil pattern disposed on the support substrate in a stacking direction and perpendicular to a first surface of the body; and first and second lead portions exposed to the first surface of the body and spaced apart from each other; and first and second external electrodes disposed on the first surface of the body, spaced apart from each other, and connected to the first and second lead portions, respectively, wherein each of the first and second lead portions and the coil pattern includes a first metal layer disposed on the support substrate, and at least one of the first or second lead portions further includes a second metal layer disposed directly on the first metal layer in the stacking direction, and wherein a distance from the support substrate to an outermost surface of the at least one of the first or second lead portions in the stacking direction is greater than a distance from the support substrate to an outermost surface of the coil pattern in the stacking direction.

2. The coil component of claim 1, wherein a height of at least one of the first or second lead portions in a height direction is greater than a height of the coil pattern in the height direction, the height direction referring to the stacking direction.

3. The coil component of claim 1, wherein a boundary between the first metal layer and the second metal layer of at least one of the first or second lead portions is exposed to the first surface of the body.

4. The coil component of claim 1, wherein in at least one of the first or second lead portions, a cross-section of the first metal layer at a center thereof in a height direction and a cross-section of the second metal layer at a center thereof in the height direction are different from each other, the height direction referring to the stacking direction.

5. The coil component of claim 1, wherein in at least one of the first or second lead portions, a cross-section of the first metal layer at a center thereof in the stacking direction and a cross-section of the second metal layer at a center thereof in the stacking direction have the substantially same shape as each other.

6. The coil component of claim 4, wherein in at least one of the first or second lead portions, an area of the first metal layer exposed to the first surface of the body and an area of the second metal layer exposed to the first surface of the body are substantially equal to each other.

7. The coil component of claim 4, wherein in at least one of the first or second lead portions, an area of the first metal layer exposed to the first surface of the body is larger than an area of the second metal layer exposed to the first surface of the body.

8. The coil component of claim 4, wherein in at least one of the first or second lead portions, the cross-section of the first metal layer and the cross-section of the second metal layer are symmetrical to each other.

9. The coil component of claim 8, wherein in at least one of the first or second lead portions, an area of the first metal layer exposed to the first surface of the body is smaller than an area of the second metal layer exposed to the first surface of the body.

10. The coil component of claim 8, wherein in at least one of the first or second lead portions, the cross-section of the first metal layer has a T shape and the cross-section of the second metal layer has a reverse T shape, the reverse T shape being the T shape of the first cross-section rotated by 180° with respect to the height direction.

11. The coil component of claim 1, wherein:

each of the first and second lead portions includes a lead pattern and a sub-lead pattern respectively disposed on two surfaces of the support substrate facing each other, and each of the lead pattern and the sub-lead pattern of each of the first and second lead portions includes the first metal layer and the second metal layer.

12. The coil component of claim 11, wherein each of the first and second lead portions includes a connection via connecting the lead pattern and the sub-lead pattern through the support substrate.

13. A coil component comprising:

a body having a first surface, a first side surface and a second side surface, the first and second side surfaces each being connected to the first surface and facing each other in a first direction;

a support substrate disposed in the body;

a coil unit including:

a coil pattern disposed on at least one surface of the support substrate in the first direction and perpendicular to the first surface of the body; and first and second lead portions exposed to the first surface of the body and spaced apart from each other; and first and second external electrodes disposed on the first surface of the body, spaced apart from each other, and connected to the first and second lead portions, respectively, wherein a distance from the at least one surface of the support substrate to an outermost surface of the first or second lead portion in the first direction is greater than a distance from the at least one surface of the support substrate to an outermost surface of the coil pattern in the first direction, and wherein at least one of the first or second lead portions includes a first metal layer and a second metal layer disposed directly on the first metal layer in the first direction.

14. The coil component of claim 13, wherein a length, from the at least one surface of the support substrate along the first direction, of the first lead portion exposed to the first surface of the body is greater than a length, from the at least one surface of the support substrate along the first direction, of the coil pattern, and wherein the length, from the at least one surface of the support substrate along the first direction, of the first lead portion exposed to the first surface of the body is twice larger than the length, from the at least one surface of the support substrate along the first direction, of the coil pattern.

15. The coil component of claim 13, wherein at least one of the first or second lead portions include an area exposed to the first surface of the body, and a line width of the area in a second direction perpendicular to the first direction is substantially constant, from the at least one surface of the support substrate to one surface of the at least one of the first or second lead portions along the first direction.

16. The coil component of claim 13, wherein at least one of the first or second lead portions include an area exposed to the first surface of the body, and a line width of the area in a second direction perpendicular to the first direction decreases from the at least one surface of the support substrate to one surface of the at least one of the first or second lead portions along the first direction.

17. The coil component of claim 13, wherein at least one of the first or second lead portions include an area exposed to the first surface of the body, and a line width of the area in a second direction perpendicular to the first direction increases from the at least one surface of the support substrate to one surface of the at least one of the first or second lead portions along the first direction.

18. A coil component comprising:

a body;

a support substrate disposed in the body;

a coil unit including:

a coil pattern disposed on the support substrate in a stacking direction and perpendicular to a first surface of the body; and first and second lead portions exposed to the first surface of the body and spaced apart from each other; and first and second external electrodes disposed on the first surface of the body, spaced apart from each other, and connected to the first and second lead portions, respectively, wherein each of the first and second lead portions and the coil pattern includes a first metal layer disposed on the support substrate, and at least one of the first or second lead portions further includes a second metal layer disposed directly on the first metal layer, and wherein a distance from the support substrate to an outermost surface of the at least one of the first or second lead portions in the stacking direction is greater than a distance from the support substrate to an outermost surface of the coil pattern in the stacking direction.

* * * * *